United States Patent
Periyasamy et al.

(10) Patent No.: US 11,541,982 B2
(45) Date of Patent: Jan. 3, 2023

(54) STIFFENED STRUCTURAL COMPONENT FOR AN AIRCRAFT

(71) Applicants: Airbus Operations GmbH, Hamburg (DE); Airbus Operations SAS, Toulouse (FR)

(72) Inventors: Chinnarajan Periyasamy, Hamburg (DE); Akshay Srinivasamurthy, Bangalore (IN); Wolfgang Entelmann, Hamburg (DE); Wolfgang Schulze, Hamburg (DE); Jens Rohde, Hamburg (DE)

(73) Assignees: Airbus Operations GmbH; Airbus Operations SAS

( * ) Notice: Subject to any disclaimer, the term of this patent is extended or adjusted under 35 U.S.C. 154(b) by 261 days.

(21) Appl. No.: 16/815,225

(22) Filed: Mar. 11, 2020

(65) Prior Publication Data
US 2020/0307756 A1 Oct. 1, 2020

(30) Foreign Application Priority Data
Mar. 28, 2019 (EP) .................... 19165843

(51) Int. Cl.
| | |
|---|---|
| *B64C 1/12* | (2006.01) |
| *B64C 1/10* | (2006.01) |
| *B64F 5/10* | (2017.01) |
| *B64C 3/26* | (2006.01) |
| *B64C 5/02* | (2006.01) |

(52) U.S. Cl.
CPC ................ *B64C 1/12* (2013.01); *B64C 1/10* (2013.01); *B64C 3/26* (2013.01); *B64C 5/02* (2013.01); *B64F 5/10* (2017.01)

(58) Field of Classification Search
CPC ................ B64C 1/12; B64C 1/10; B64C 3/26
See application file for complete search history.

(56) References Cited

U.S. PATENT DOCUMENTS

| | | | | |
|---|---|---|---|---|
| 5,893,534 A | * | 4/1999 | Watanabe | ............. B64C 1/0685 244/119 |
| 2004/0075023 A1 | | 4/2004 | Assler et al. | |
| 2011/0186683 A1 | | 8/2011 | Lonsdorfer et al. | |
| 2014/0044914 A1 | | 2/2014 | Kurtz et al. | |
| 2014/0145031 A1 | | 5/2014 | Moselage, III | |

FOREIGN PATENT DOCUMENTS

| | | | |
|---|---|---|---|
| DE | 102009060706 A1 | 6/2011 | |
| EP | 2824031 A2 | 1/2015 | |
| WO | WO-2012050450 A1 * | 4/2012 | ............... B32B 5/26 |
| WO | 2012150240 A1 | 11/2012 | |

OTHER PUBLICATIONS

Extended European Search Report including the Search Opinion for Application No. EP 19165843.4 dated Sep. 3, 2019, 7 pages.

\* cited by examiner

*Primary Examiner* — Timothy D Collins
*Assistant Examiner* — Eric Acosta
(74) *Attorney, Agent, or Firm* — Lerner, David, Littenberg, Krumholz & Mentlik, LLP

(57) ABSTRACT

A stiffened structural component for an aircraft includes a first material sheet with a first surface, and at least one elongate bulge that bulges out in a direction transverse to the first surface in order to stiffen the structural component, wherein each of the at least one bulge comprises two edges that extend along the first surface, wherein a continuous bulging surface extends between the edges, and wherein the bulges are formed integrally into the first material sheet through pressing.

14 Claims, 5 Drawing Sheets

STIFFENED STRUCTURAL COMPONENT FOR AN AIRCRAFT

FIELD OF THE INVENTION

The invention relates to a stiffened structural component for an aircraft as well as an aircraft having such a stiffened structural component.

BACKGROUND OF THE INVENTION

Large structural components for transportation means, such as aircraft, are often manufactured by using surface-like components, to which stiffening elements are attached. For example, fuselage skin components of an aircraft often comprise a sheet-like skin, to which a plurality of stringers are attached that commonly extend along the longitudinal axis of the aircraft. The stringers may be bonded, welded or riveted to the skin. The stringers usually comprise a curved profile and a base surface, which conforms the shape of the skin. The manufacturing process thus requires producing a plurality of stringers, their correct placement and an appropriate bonding or connection.

US20040075023A1 shows a lightweight, laminated structural component, such as a skin section for an aircraft fuselage, which is constructed of at least two sheet metal plies that are adhesively bonded to each other. One of the plies is uninterrupted, while the other ply is a lattice with open fields surrounded by strip shaped lands.,

BRIEF SUMMARY OF THE INVENTION

An aspect of the invention proposes a structural component for an aircraft that can be manufactured more simply and that comprises at least the same or even a superior structural stability.

A stiffened structural component for an aircraft is proposed, the component comprising a first material sheet with a first surface, and at least one elongate bulge that bulges out in a direction transverse to the first surface in order to stiffen the structural component, wherein each of the at least one bulge comprises two edges that extend along the first surface, wherein a continuous bulging surface extends between the edges, and wherein the bulges are formed integrally into the first material sheet through pressing.

The structural component may be considered a component that is subjected to a substantial mechanical load, which is to be absorbed by the structural component. Thus, the structural component may be a substantial mechanical part of the aircraft, which may either define the shape of at least a part of the aircraft or that bears a substantial mechanical load that arises during the operation of the aircraft. As an example, a skin component, a frame, a wing shell, a pressure bulkhead or other components may be considered.

The structural component is mainly defined by the first material sheet. The first material sheet is to be understood a sheet-like continuous part made from a certain material. The shape of the first material sheet can be arbitrarily selected. For example, the first material sheet is a continuous sheet of a constant thickness, at least as a starting point of a process for manufacturing the structural component.

As explained in the following, certain different materials may be considered for providing the first material sheet. For example, metallic materials may be used, such as various types of steel, aluminum alloys or other metallic materials that provide satisfying mechanical properties for the desired task of the structural component. However, also plastic materials and particularly thermoplastic materials may be considered, which allow a press-forming of the bulges. These may include, for example, Polyamide, Polyetherimide, PEKK, PEEK, PAEK, PPS or other suitable materials. A mixture of different materials, such as different metals, different plastic materials or even a mixed use of metallic and plastic materials may in some cases be beneficial. All materials may optionally comprise embedded reinforcement fibers, wherein short fibers may particularly be more suitable for press-forming than long fibers.

An aspect of the invention relates to the at least one elongate bulge that bulges out in a direction transverse to the first surface. For allowing an increased moment of inertia about an axis transverse to a main extension line of the bulge and in a distance to the first material sheet, the bulge may comprise a certain hollow profile, which is provided through pressing a section of the first material sheet into the direction transverse to the first surface. Consequently, separately manufactured parts for attachment to the first material sheet are not required. If several bulges are used, a corrugated material sheet is produced. Manufacturing such a corrugated sheet can be done by roll forming or any other feasible process which would, for example, reduce the number of individually manufactured stringers. The assembly lead times are also reduced by a large margin from this by eliminating individual assembly of stringers with a single corrugated sheet. This also comprises a higher structural stability due to the hollow profiles of the bulges.

The bulge is to be understood as a continuous surface section that extends out of the first surface transversely to a main extension plane. According to an embodiment of the invention, such a bulge is formed by pressing a certain surface section in the first surface into the transverse direction by using a pressing tool. The surface section is thus deformed to extend out of the neighboring first surface area to constitute the bulging surface. The bulging surface is continuous and preferably uninterrupted. By bulging out, at least two delimiting edges are created just between the bulging surface and the first surface. The at least two edges can be considered foot or base lines between the bulging surface and the first surface. The bulging surface extends from the at least two edges into the transverse direction.

To sum up, the structural component according to an embodiment of the invention only requires a reduced number of parts to be assembled and reduce lead times of manufacturing and assembly of an aircraft structure.

In a preferred embodiment the component comprises a plurality of bulges that are arranged at a distance to each other. The bulges may preferably comprise the same profiles, i.e. the same shape of a cross section perpendicular to a main extension axis of the bulges. They may also be arranged in a pattern or on a grid on the first surface that may preferably be regular at least in a region or that may be irregular. For stiffening a rather large surface area it may be feasible to provide a plurality of linear or longitudinal bulges and that are parallel to each other.

In an advantageous embodiment, the bulging surface comprises a symmetric hollow profile. It may be selected from a group of different profile shapes, the group comprising omega, rectangular, square, triangular, parallelogram, half circle and other chamfered or round profile shapes. By using such a symmetrical profile, a symmetric load distribution can be achieved. If the clear span between opposed flanks of the profile shape does not decrease in an outward direction, i.e. away from the first surface, manufacturing the bulges is simplified, as the pressing tool may easily be removed from bulges after they have been pressed.

Still further, in a preferred embodiment the bulges are arranged on the first surface in a regular pattern. The pattern may include at least a group of bulges that are arranged parallel to each other and having the same distances to each other at least in a region of the first surface. It may be possible to use a single, two or more such groups. It may also be feasible to let the bulges of different groups extend into different directions. It may also be possible to use different distances between the bulges of two different groups of bulges.

In another advantageous embodiment, the bulges comprise a height in a range of 3 to 50 mm Selecting a suitable height allows to achieve a sufficient stability by providing a sufficient increase of the moment of inertia in the desired direction. Thus, depending on the structural loads on the respective component, the height may be more in the region of 3 mm or more in the region of 50 mm However, a height of 50 mm is clearly tolerable for many different designs of stiffened components.

In an advantageous embodiment, the first material sheet is made from a metallic material. As indicated above, the metallic material may comprise one from a variety of different aluminum alloys, different types of steel, titanium or other metallic materials suitable for the respective task of the component. Depending on the pressing tool and pressing method a certain metallic material may be preferred over others.

Further advantageously, the material of the first material sheet is not precipitation hardenable. Hence, in particular with a hot forming process, the desired mechanical properties can be maintained.

Advantageously, the metallic material of the first material sheet comprises a 5000-series aluminum alloy. If the bulges are formed by a hot forming process, the respective first material sheet needs to be heated to a temperature that leads to a sufficient softening of the material that allows the hot forming. Aluminum alloy may exemplarily be heated to a temperature of about 300° C. Thus, a 5000 series aluminum alloy may be suitable, since it is not precipitation hardenable. This means that the mechanical integrity of the first material sheet will not be reduced through the process of heating and subsequent forming. However, with other materials, such as other alloys or thermoplastic materials, other boundary conditions and requirements must be met.

As stated above, in an exemplary embodiment the bulges are formed by a hot forming process. Hot forming or hot working stands for plastically deforming of the first material sheet that has an elevated temperature. If the first material sheet comprises a metallic material, the temperature to which it is heated before being deformed may exceed a recrystallization temperature, which allows a recrystallization after the deforming process and prevents the component from being strain hardened. Precipitation hardenable metallic materials do not seem to be a suitable basis for the first material sheet, as the hardening would need to be reverted through a solution annealing. Thus, a 5000-series aluminum would be more suitable for the process of hot forming than a 6000 serious aluminum, which is precipitation hardenable. This applies in analogy to other metallic materials.

The structural component may further comprise a second material sheet, which is attached to the second surface of the first material sheet. Thus, the second material sheet together with the first material sheet provides an integral component, which may then comprise a closed surface on one side and the appearance of a corrugated sheet on the other side, depending on the number of bulges. Thus, this arrangement allows the component to be a part of an aerodynamic surface, such as a fuselage skin, a wing shell, a part of the tail plane or other surfaces that are exposed to a direct airflow.

Preferably, the second material sheet is attached to the first material sheet through material bonding. The second material sheet is thus glued or welded to the first material sheet. If both materials sheets are made from a metallic material, gluing may be a feasible approach to prevent local deformations due to heat strains. If material sheets from a thermoplastics material are used, they may be welded, as heat strains may be limited compared to the welding of metals. By materially bonding both material sheets, a smooth and very harmonic design may be achieved.

In an advantageous embodiment, the first material sheet comprises at least one cutout between at least two bulges. In particular when combining the first material sheet with a second material sheet, cutouts lead to a distinct reduction of weight. In a special embodiment, a plurality of cutouts is formed in the first material sheet and extends in a free space between neighboring bulges. For being able to attach the first material sheet to the second material sheet it is feasible to provide at least stripe-shaped flat surface areas laterally to the bulges. The flat surface regions may be flushly arranged on the second material sheet. In these regions, mechanical connection elements extending through both material sheets or bonding agents can be applied. If a plurality of cutouts is provided and if they extend over substantial regions of the first material sheet, a grid-like structure is created, which may be placed on the second material sheet with all bulges in a correct relative placement. Thus, compared to common methods for stiffening a surface-like material sheet, an elaborate positioning process for positioning a plurality of stiffening elements to a surface is clearly simplified.

The structural component may further comprise at least one cover plate for covering a bulge on a side opposite the bulging surface. The cover plate is able to close an open side of a bulge, such that the second surface is substantially closed. The cover plate may be bonded to the second surface to maintain its position. It may be feasible to seal the transition between the second surface and the cover plate to prevent ingress of moisture or water condensation effects.

Advantageously, the structural component may be selected from a group of structural components, the group consisting of a fuselage skin component, an airframe component, a rear pressure bulkhead, a wing shell, a horizontal tail plane shell, a vertical tail plane shell, floor panels for a cabin of the aircraft, primary or secondary flight control surfaces, movable flow bodies in general. By using a stiffened structural component according to the invention for these purposes, the manufacturing process will be clearly accelerated and simplified, while the total weight is reduced, and the structural stability is maintained, in comparison with common designs of structural components for the given purposes.

In an exemplary embodiment, the structural component is a rear pressure bulkhead for a pressurized cabin of an aircraft, the rear pressure bulkhead comprising a plurality of radial bulges distributed around a central region of the rear pressure bulkhead. By pressing the bulges into the first material sheet, they may protrude into a direction of the pressurized cabin. Open ends of the bulges may face into a non-pressurized fuselage region and do not necessarily need to be closed. The pressure bulkhead serves for separating a pressurized part of the fuselage from an unpressurized part of the fuselage. It thus needs to be pressure-tight as a whole. The bulkhead may comprise a strong curvature around at least one axis. For example, it may comprise a shape similar to a spherical cap. Starting from a planar material sheet, both the curvature and the bulges may be created in a single pressing step.

In another advantageous embodiment, the component is a fuselage skin component for a fuselage of an aircraft, the fuselage skin component comprising a plurality of axial bulges arranged parallel and at a distance to each other. Thus, the bulges may provide the function of longitudinal stiffening elements, i.e. stringers.

Finally, the invention relates to an aircraft having at least one such structural component.

As mentioned above, the at least one structural component may be selected from a group of structural components, the group consisting of a fuselage skin component, an airframe component, a rear pressure bulkhead, a wing shell, a horizontal tail plane shell, a vertical tail plane shell, floor panels for a cabin of the aircraft, primary or secondary flight control surfaces, movable flow bodies in general.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION

Figure 1:
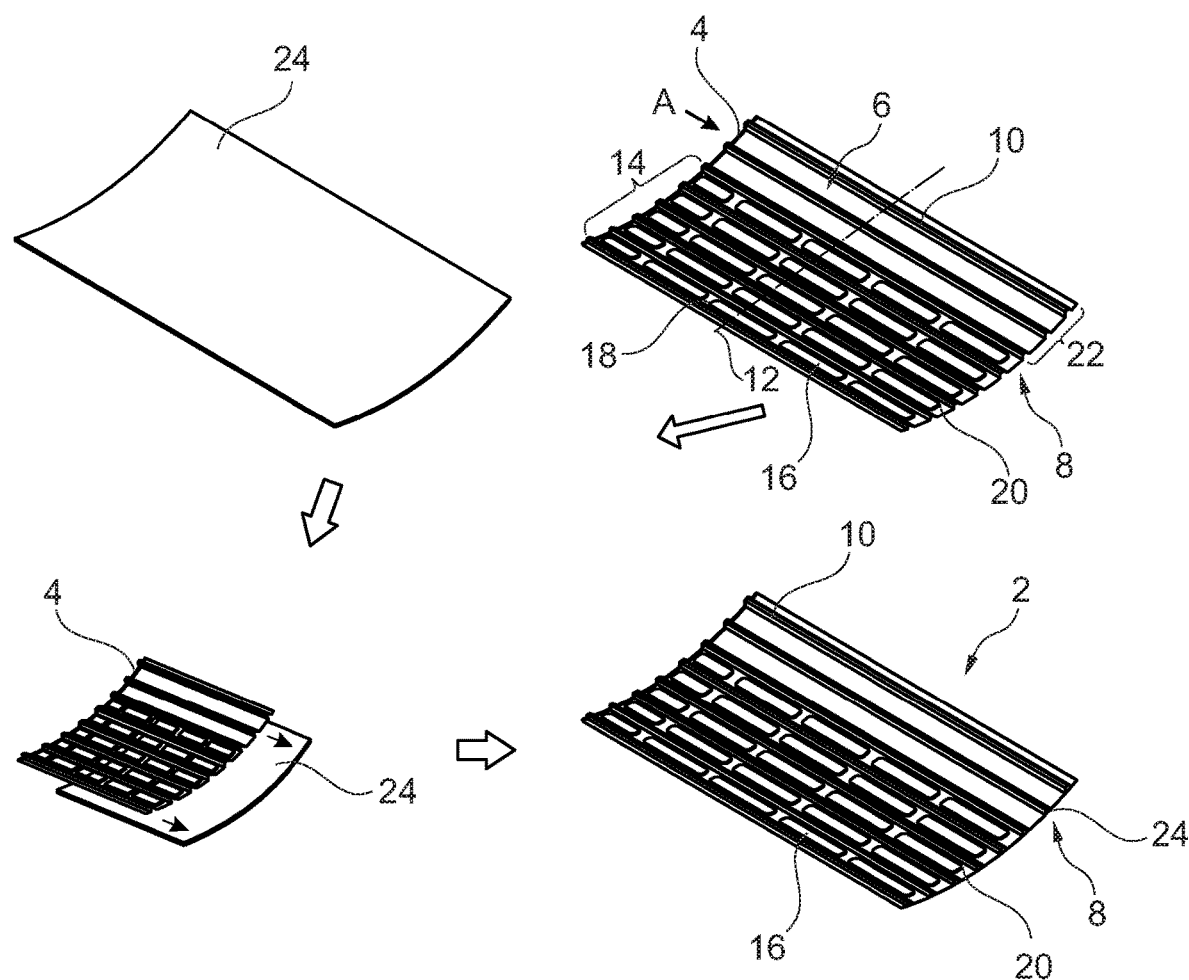
FIG. 1 shows a schematic illustration of a stiffened structural component and its manufacturing.

FIG. 1 shows an exemplary embodiment of a stiffened structural component 2 as well as a very schematic illustration of a process for manufacturing the component 2. A first material sheet 4 is provided, which comprises a first surface 6 and a second surface 8 on the opposite side. On the first surface 6, a plurality of elongate bulges 10 are provided. They are arranged parallel and at a distance to each other.

The bulges 10 bulge out from the first surface 6 into a direction transverse thereto. In doing so, they increase the moment of inertia around an axis 12, which is schematically shown just for illustration purposes.

A first section 14 of the first material sheet 4 comprises a plurality of cutouts 16, which are arranged between neighboring bulges 10. The cutouts 16 are arranged in a pattern or grid on the first material sheet 4 in order to create several webs 18 and 20 that allow the first material sheet 4 to be flushly laid onto another surface. In a second section 22, the spaces between neighboring bulges 10 are continuous and do not comprise cutouts 16.

The first material sheet 4 is created through a pressing process. Thus, a planar base sheet as a starting point is formed through a pressing tool to not only provide a slight curvature as visible in FIG. 1, but also a plurality of bulges 10. While the cutouts 16 may be formed by pressing, too, they may also be machined after or before the press-forming.

Different pressing methods are applicable depending on the material properties of the selected material for the first material sheet 4. For example, a cold pressing may be conducted, such as a roll forming or a similar method. Hereby, the base sheet is fed into a roll forming tool and by passing through it, the bulges 10 and the curvature are created. Also, incremental and magnetic pulse forming processes may be used.

In a hot forming process, the base sheet is heated to a certain temperature, that depends on the selected material. If the material of the first material sheet 4 is a metallic material, heating above a recrystallization temperature is feasible. In the case of aluminum alloy this may be a temperature of about or slightly above 300° C. After forming the bulges 10 into the first material sheet 4 as well as creating the curvature, the material may recrystallize, which leads to an improved mechanical stability. If, however, the material is a thermoplastic material, it may be heated to a certain temperature at which the material is clearly softened, but not molten.

An advantage of a hot forming process is an improved deformability of the material allowing to provide a plurality of different local and global deformations at once, i.e. in a single step. By adjusting the temperature of the material before deforming it, superior mechanical properties are achieved.

In the example shown in FIG. 1, additionally a second material sheet 24 is provided. In this example, the second material sheet 24 has a similar curvature as the first material sheet 4 but is realized as a continuous material sheet. Hence, the first material sheet 4 and the second material sheet 24 may be combined to form the stiffened structural component 2. Between both material sheets 4 and 24, a bonding agent can be placed. Due to the cutouts 16 the weight of the structural component 2 is optimized.

Figure 2:
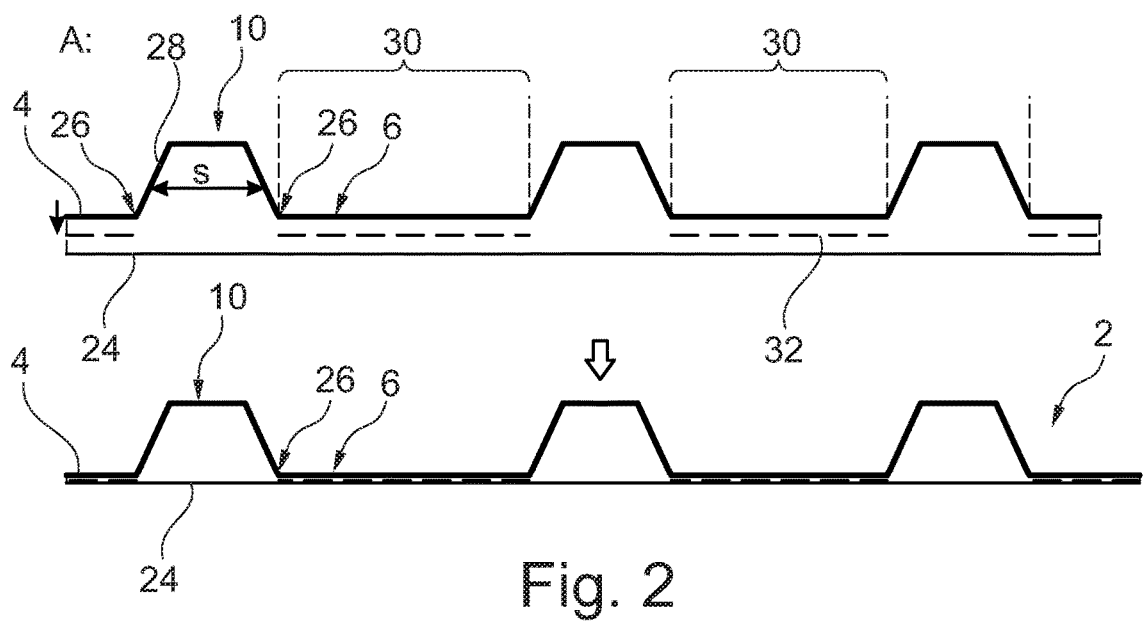
FIG. 2 shows a detail view of the structural component in two different views.

FIG. 2 shows a detailed lateral view of the first material sheet 4 from the direction indicated in FIG. 1 by the letter A. Here, the bulges 10 are shown to comprise a symmetric trapezoid shape with a clear span s, which is decreasing with increasing distance from the first surface 6. Each of the bulges 10 has a foot region in the form of two opposed edges 26 that are placed just on the first surface 6 and on a bulging surface 28 of the respective bulge 10. The edges 26 are arranged at a distance to each other and extend along the first surface 6. Furthermore, between neighboring bulges 10 a substantially flat surface region 30 is present.

As shown in an upper part of FIG. 2, the first material sheet 4 is arranged on the second material sheet 24, wherein both sheets 4 and 24 enclose a bonding agent 32, such as a glue. Thus, both material sheets 4 and 24 are bonded together. This leads to the setup shown in the lower part of FIG. 2. Here, the bulges 10 provide a stiffening function on one side of the component 2, while the second material sheet 24 provides a continuously closed and smooth surface that is suitable for aircraft components directly exposed to an airflow.

Figure 3:
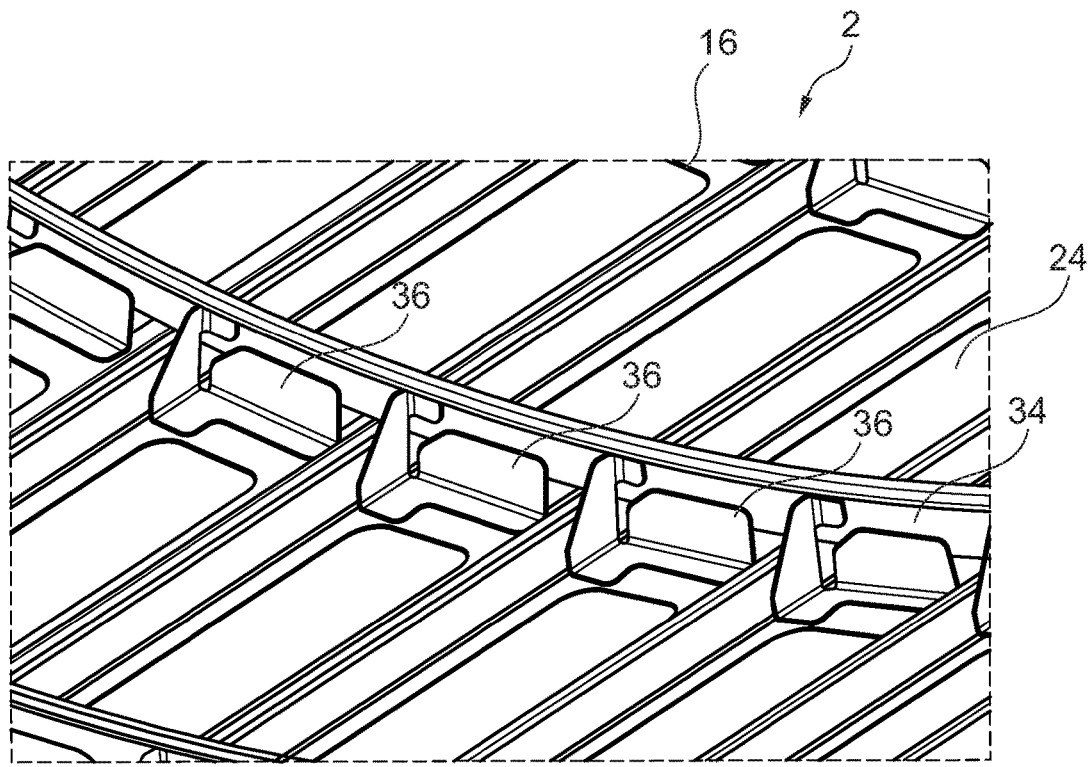
FIG. 3 shows a partial view onto a structural component as a fuselage skin attached to a frame.

FIG. 3 shows the structural components 2 as a part of a fuselage structure of an aircraft. Here, a part of a circular frame 34 is shown, to which the structure component 2 is attached by using several clips 36. The cutouts 16 lead to a reduced effective thickness of a fuselage skin. The bulges 10 comprise a common pitch, i.e. a distance between their longitudinal axes, as common stringers. However, due to their structure, they are able to provide an improved moment of inertia.

Figure 4A:
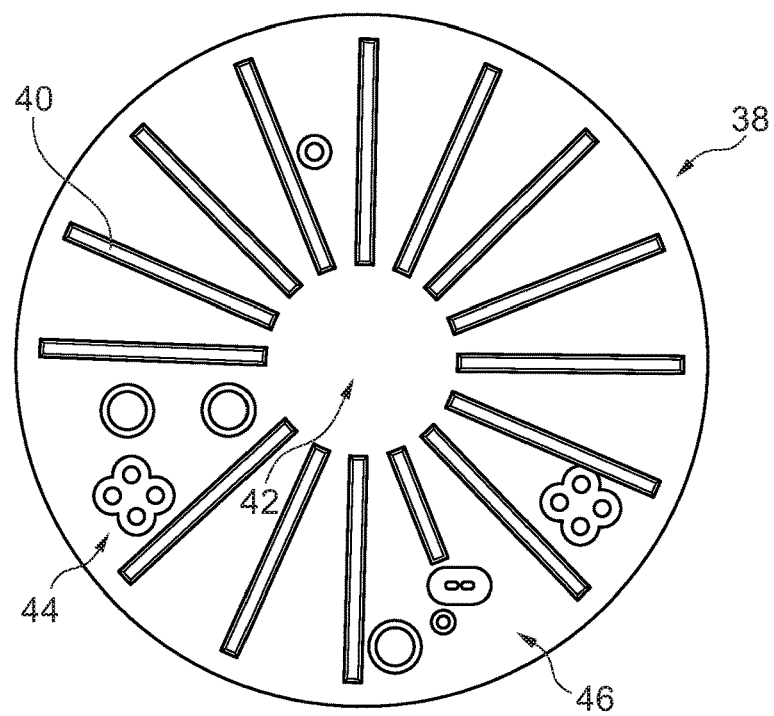
FIGS. 4a to 4d show a rear pressure bulkhead in a front view (4a), a rear view (4b), a front detail (4c) and a rear detail (4d).

FIGS. 4a, 4b, 4c and 4d show a further stiffened structural component 38 in the form of a rear pressure bulkhead. FIG. 4a shows a front view, i.e. the side of the pressure bulkhead that faces to the front of the aircraft and into the pressurized cabin. Here, several bulges 40 are radially arranged and distributed around a central region 42. In this example, they are evenly distributed and thus enclose the same angles to each other throughout the pressure bulkhead 38. However, due to certain required installations 44 and 46, they may comprise different lengths or they are partially left out completely.

Figure 4B:
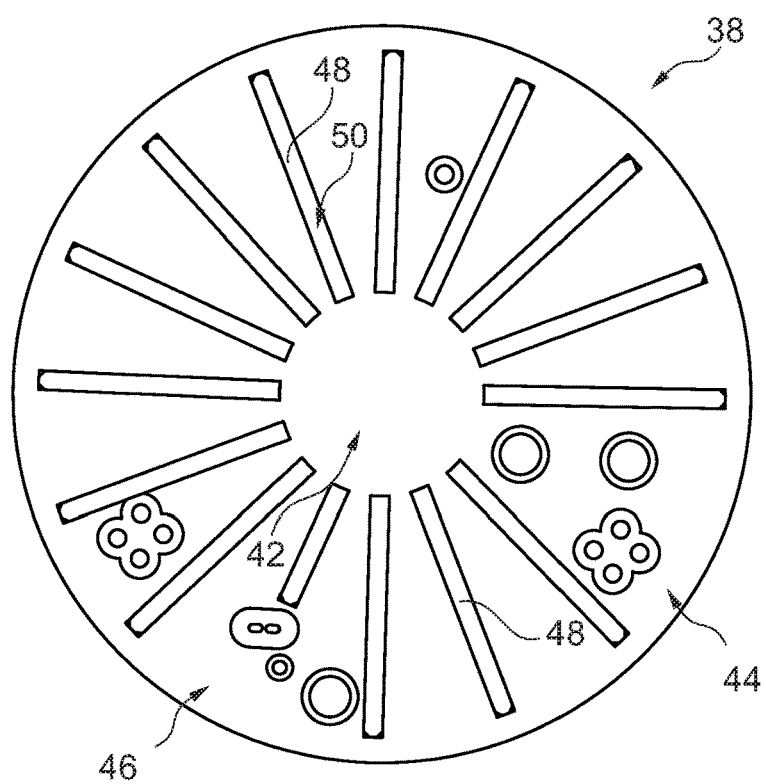
Figure 4C:
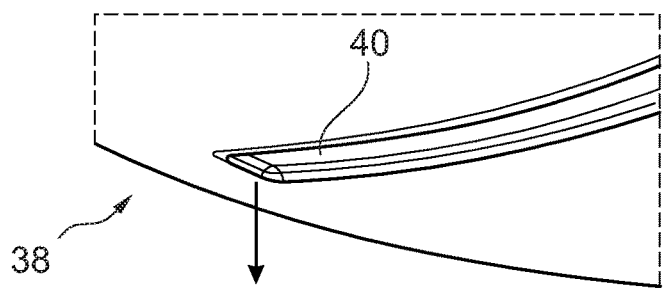
Figure 4D:
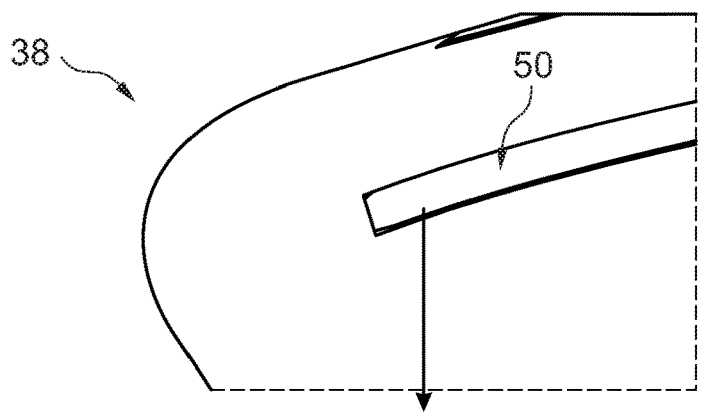

FIG. 4c shows the bulges 40 and in a three-dimensional view. The pressure bulkhead 38 with its curvature as well as its plurality of bulges 40 may be created in a single manufacturing, i.e. pressing step. FIG. 4b shows a rear view of the pressure bulkhead 38 comprising open sides 48 of the bulges 40. They may be closed by cover plates 50 as shown in FIG. 4d.

Figure 5:
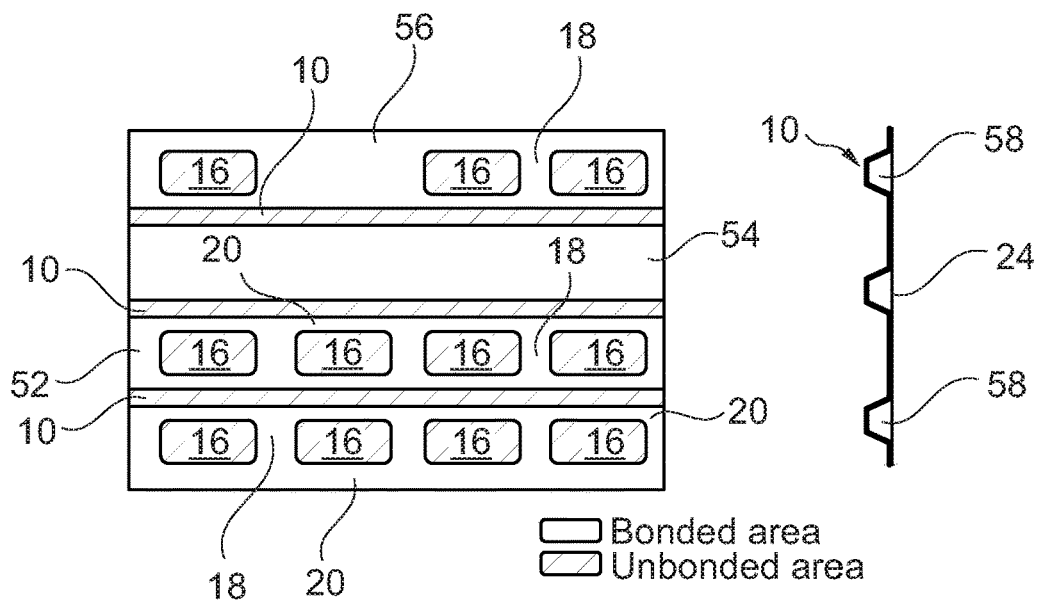
FIG. 5 shows a schematic view of a bonding area.

FIG. 5 shows a schematic view of a bonding area between the first material sheet 4 and the second material sheet 24 of the first exemplary embodiment. Here, different aspects are shown for optimizing the mechanical properties of the component 2. A bonded area 52 includes the bonding agent 32 between both material sheets 4 and 24. The bonded area 52 surrounds the cutouts 16. Several bulges 10 are arranged parallel and at a distance to each other and extend along the bonded area 52. Exemplarily, they may enclose a surface area 54 that does not comprise cutouts 16 and that is machined for a variable thickness for optimization purposes. The same applies to a surface area 56 between cutouts 16. The bulges 10 may be filled with a lightweight material 58 that may be a foam or another material with a low density or may be left completely hollow.

Figure 6:
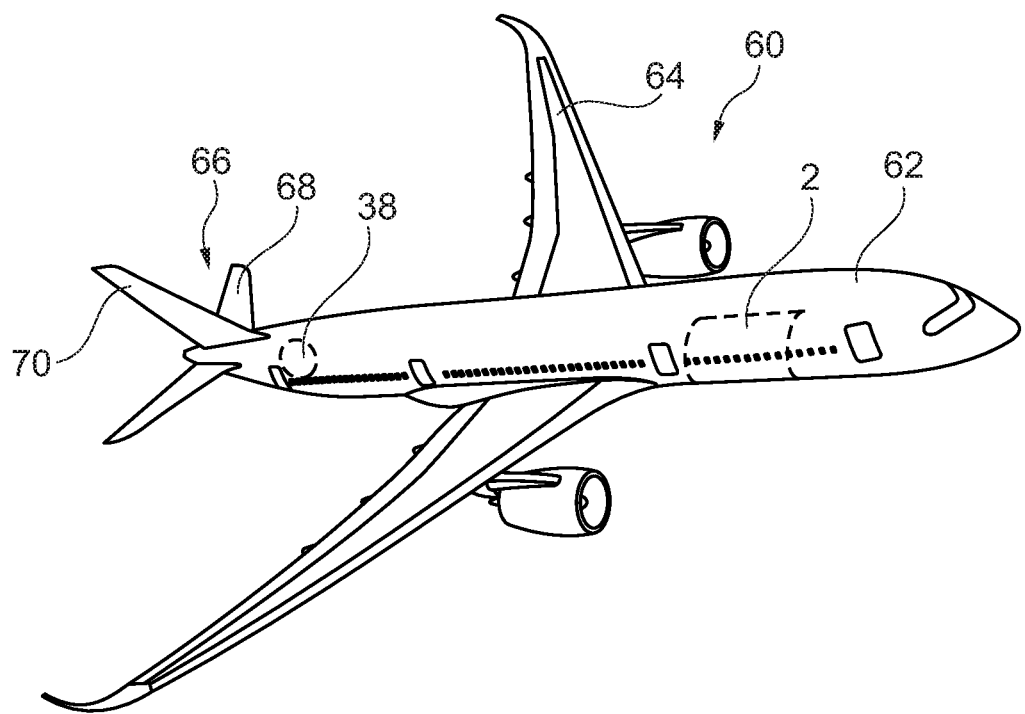
FIG. 6 shows an aircraft having at least one such structural component.

Finally, FIG. 6 shows an aircraft 60 having a fuselage 62, wings 64, a tail plane 66 with a horizontal tail plane 68 and a vertical tail plane 70. On a rear side underneath all forward of the tail plane 66, a rear pressure bulkhead 38 may be placed. The fuselage 62 may comprise at least one component 2 explained above. Also, the wings 64 may comprise at least one such stiffened structural component 2.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS

2 Stiffened structural component
4 first material sheet
6 first surface
8 second surface
10 bulge
12 axis
14 first section
16 cutout
18 web
20 web
22 second section
24 second material sheet
26 edge
28 bulging surface
30 flat surface region
32 bonding agent
34 circular frame
36 clip
38 stiffened structural component
40 bulge
42 central region
44 installation
46 installation
48 open side
50 cover plate
52 bonded area
54 surface area
56 surface area
58 lightweight material
60 aircraft
62 fuselage
64 wing
66 tail plane
68 horizontal tail plane
70 vertical tail plane

The invention claimed is:

1. A stiffened structural component for an aircraft, comprising:
   a first material sheet with a first surface and having a first section and a second section; and
   a plurality of bulges, each of the plurality of bulges bulging out in a direction transverse to the first surface to stiffen the structural component,
   wherein each of the plurality of bulges comprises two edges extending along the first surface,
   wherein a continuous bulging surface extends between the two edges,
   wherein the plurality of bulges is formed integrally through pressing into the first material sheet,
   wherein the first section comprises a plurality of cutouts arranged between neighboring bulges of the plurality of bulges, and
   wherein the second section comprises continuous spaces between neighboring bulges of the plurality of bulges without cutouts.

2. The structural component of claim 1, wherein the plurality of bulges is arranged at a distance to each other.

3. The structural component of claim 1, wherein the continuous bulging surface comprises a symmetric hollow profile.

4. The structural component of claim 2, wherein the plurality of bulges is arranged on the first surface in a regular pattern.

5. The structural component of claim 1, wherein each of the plurality of bulges comprises a height in a range of 3 to 50 mm.

6. The structural component of claim 1, wherein the material of the first material sheet is not precipitation hardenable.

7. The structural component of claim 1, wherein the plurality of bulges is formed by a hot forming process.

8. The structural component of claim 1, further comprising a second material sheet attached to a second surface of the first material sheet.

9. The structural component of claim 8, wherein the second material sheet is attached to the first material sheet through material bonding.

10. The structural component of claim 1, further comprising at least one cover plate for covering a bulge on a side opposite the bulging surface.

11. The structural component of claim 1, wherein the component is a rear pressure bulkhead for a pressurized cabin of an aircraft, the plurality of bulges comprising a plurality of radial bulges, distributed around a central region of the rear pressure bulkhead.

12. The structural component of claim 1, wherein the component is a fuselage skin component for a fuselage of an aircraft, the plurality of bulges comprising a plurality of axial bulges arranged parallel and at a distance to each other.

13. An aircraft, having at least one structural component of claim 1.

14. The aircraft according to claim 13, wherein the at least one structural component is selected from a group of structural components, the group consisting of
a fuselage skin component,
an airframe component,
a rear pressure bulkhead,
a wing shell,
a horizontal tail plane shell,
a vertical tail plane shell,
floor panels for a cabin of the aircraft,
primary or secondary flight control surfaces,
movable flow bodies in general.

* * * * *